(12) United States Patent
Wilcox et al.

(10) Patent No.: US 9,650,149 B2
(45) Date of Patent: May 16, 2017

(54) FIRE CONTAINMENT APPARATUSES FOR AIRCRAFT DUCT ASSEMBLIES

(71) Applicant: HONEYWELL INTERNATIONAL INC., Morristown, NJ (US)

(72) Inventors: David Eugene Wilcox, Gilbert, AZ (US); Thomas Kolberg, Goodyear, AZ (US); Mike Hammer, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 141 days.

(21) Appl. No.: 14/563,500

(22) Filed: Dec. 8, 2014

(65) Prior Publication Data

US 2016/0159489 A1 Jun. 9, 2016

(51) Int. Cl.
   *B64C 33/02* (2006.01)
   *F02C 7/25* (2006.01)
   *B64D 33/02* (2006.01)
   *B64D 41/00* (2006.01)

(52) U.S. Cl.
   CPC ............ *B64D 33/02* (2013.01); *B64D 41/00* (2013.01); *F02C 7/25* (2013.01); *B64D 2033/0213* (2013.01)

(58) Field of Classification Search
   CPC ... B64D 33/02; F02G 1/00; F02G 1/02; F02G 3/00; F02G 7/25; F02C 7/25; B64C 1/1453
   See application file for complete search history.

(56) References Cited

U.S. PATENT DOCUMENTS

| 3,196,977 | A | * | 7/1965 | Sanders | .................... F01N 1/10 181/256 |
| 3,338,331 | A | * | 8/1967 | Jettinghoff | .............. F01N 1/003 181/227 |
| 3,556,444 | A | * | 1/1971 | Gerhard | .................... F02C 7/00 222/108 |
| 3,638,905 | A | * | 2/1972 | Ferris | ...................... F16K 35/06 251/94 |
| 4,032,091 | A | * | 6/1977 | Reddy | ..................... F02C 7/232 123/510 |
| 4,244,441 | A | * | 1/1981 | Tolman | ................... F01D 25/30 181/213 |

(Continued)

OTHER PUBLICATIONS

Extended EP Search Report for Application No. 15197398.9-1754 dated Sep. 5, 2016.

*Primary Examiner* — Christopher P Ellis
*Assistant Examiner* — Michael Wang
(74) *Attorney, Agent, or Firm* — Lorenz & Kopf, LLP (57) ABSTRACT

An intake duct assembly for an auxiliary power unit system is provided. A first inlet adapter includes at least one hole through the duct wall. A fire containment apparatus forms a first passage to direct intake air between exterior wall of the aircraft and the enclosure. An inner duct mounted on the first inlet adapter at a first position downstream of the at least one hole and mounted on the second inlet adapter. An outer sheath is mounted on the first inlet adapter at a second position upstream of the at least one hole and mounted on the second inlet adapter. The outer sheath circumscribes the inner duct to form at least a portion of a barrier annulus between the inner duct and outer sheath in fluid communication with the first passage via the at least one hole in the first inlet adapter.

18 Claims, 10 Drawing Sheets

(56) References Cited

U.S. PATENT DOCUMENTS

| | | | | |
|---|---|---|---|---|
| 4,615,359 | A * | 10/1986 | Affa | F16L 59/07 |
| | | | | 138/104 |
| 4,979,587 | A * | 12/1990 | Hirt | F01N 1/003 |
| | | | | 181/213 |
| 5,495,873 | A * | 3/1996 | Butkiewicz | F01N 13/141 |
| | | | | 138/114 |
| 5,996,938 | A * | 12/1999 | Simonetti | B64C 1/1453 |
| | | | | 244/129.1 |
| 6,558,137 | B2 * | 5/2003 | Tomell | F04B 39/0055 |
| | | | | 181/256 |
| 7,367,424 | B2 * | 5/2008 | Brown | B64D 41/00 |
| | | | | 181/249 |
| 8,096,498 | B2 * | 1/2012 | Francisco | B64D 41/00 |
| | | | | 244/129.5 |
| 8,211,518 | B2 * | 7/2012 | Fernandes | F16L 9/18 |
| | | | | 428/34.1 |
| 8,631,637 | B2 * | 1/2014 | DeDe | F02C 7/25 |
| | | | | 244/56 |
| 8,820,045 | B2 * | 9/2014 | DeDe | F02C 7/25 |
| | | | | 60/39.094 |
| 9,376,946 | B1 * | 6/2016 | Eliers | F01N 1/026 |
| | | | | 181/207 |
| 2004/0069563 | A1 * | 4/2004 | Zirkelbach | F01N 1/026 |
| | | | | 181/269 |
| 2005/0067220 | A1 * | 3/2005 | Keller | F02M 35/1216 |
| | | | | 181/250 |
| 2006/0218934 | A1 * | 10/2006 | Williams | B64D 41/00 |
| | | | | 60/785 |
| 2013/0037122 | A1 * | 2/2013 | Nager | B64D 41/00 |
| | | | | 137/15.1 |

* cited by examiner

FIRE CONTAINMENT APPARATUSES FOR AIRCRAFT DUCT ASSEMBLIES

TECHNICAL FIELD

The present invention generally relates to aircraft systems, and more particularly relates to fire containment apparatuses for aircraft duct assemblies.

BACKGROUND

Aircraft often have an on-board auxiliary power unit to provide electrical power and compressed air to various systems. When the aircraft is on the ground, the auxiliary power unit is the primary source of power to drive the environmental control systems, hydraulic components, and the starters for the engines. During flight, the auxiliary power unit may provide pneumatic and electric power.

The auxiliary power unit is typically arranged within a fire containment enclosure in the tailcone of an aircraft. Generally, one or more intake ducts extend between respective intake openings in the exterior surface of the aircraft and the auxiliary power unit and/or the fire containment enclosure to define airflow passages through which air for the auxiliary power unit is drawn. The air flowing through the intake duct may be used to run the auxiliary power unit, cool the auxiliary power unit oil, and/or ventilate the auxiliary power unit compartment. It is generally desirable to improve the fire containment capabilities of the auxiliary power unit, particularly at the intake ducts extending between openings in the fire containment enclosure to the exterior of the aircraft.

Accordingly, it is desirable to provide auxiliary power unit assemblies with improved fire containment characteristics. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an intake duct assembly is provided for directing intake air between an enclosure of an auxiliary power unit and an exterior wall of an aircraft. The interior duct assembly includes a first inlet adapter configured to be mounted on a first opening through the enclosure. The first inlet adapter includes a duct wall defining at least one hole through the duct wall. The interior duct assembly includes a second inlet adapter configured to be mounted on a second opening through the exterior wall. The interior duct assembly includes a fire containment apparatus extending between the first inlet adapter and the second inlet adapter to form a first passage to direct intake air in a downstream direction through the second opening in the exterior wall of the aircraft, through the second inlet adapter, through the fire containment apparatus, through the first intake adapter, and into the enclosure through the first opening. The fire containment apparatus includes an inner duct mounted on the first inlet adapter at a first position downstream of the at least one hole and mounted on the second inlet adapter; and an outer sheath mounted on the first inlet adapter at a second position upstream of the at least one hole and mounted on the second inlet adapter. The outer sheath circumscribes the inner duct to form at least a portion of a barrier annulus between the inner duct and outer sheath in fluid communication with the first passage via the at least one hole in the first inlet adapter.

In accordance with another exemplary embodiment, an auxiliary power unit system is provided for an aircraft. The auxiliary power unit system includes an enclosure defining a first intake opening; an auxiliary power unit arranged within the enclosure; and an intake duct assembly extending between the first intake opening in the enclosure to a second intake opening on an external wall of the aircraft. The intake duct assembly includes a first inlet adapter mounted on the first intake opening, the first inlet adapter including a duct wall defining at least one hole through the duct wall; a second inlet adapter mounted on the second intake opening through the exterior wall; and a fire containment apparatus extending between the first inlet adapter and the second inlet adapter to form a first passage to direct intake air in a downstream direction through the second opening, through the second inlet adapter, through the fire containment apparatus, through the first intake adapter, and into the enclosure through the first opening. The fire containment apparatus includes an inner duct mounted on the first inlet adapter at a first position downstream of the at least one hole and mounted on the second inlet adapter; and an outer sheath mounted on the first inlet adapter at a second position upstream of the at least one hole and mounted on the second inlet adapter. The outer sheath circumscribes the inner duct to form at least a portion of a barrier annulus between the inner duct and outer sheath in fluid communication with the first passage via the at least one r hole in the first inlet adapter.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include auxiliary power unit systems having intake duct assemblies with improved fire containment characteristics. In particular, exemplary embodiments include a fire containment apparatus extending between inlet adapters on an auxiliary power unit enclosure and the outer wall of the aircraft. The fire containment apparatus may include an inner duct that forms a portion of the main intake passage and an outer sheath that forms a barrier annulus with the outer surface of the inner duct. The inlet adapter on the enclosure has a series of holes, and the inner duct and outer sheath are mounted on an inlet adapter such that the barrier annulus is in fluid communication with the main intake passage through the holes. During a fire event, combustion gases formed in the barrier annulus may be vented through the holes to assist fire containment. Additionally, the outer sheath may be mounted on the inlet adapter so as to minimize heat transfer.

Figure 1:
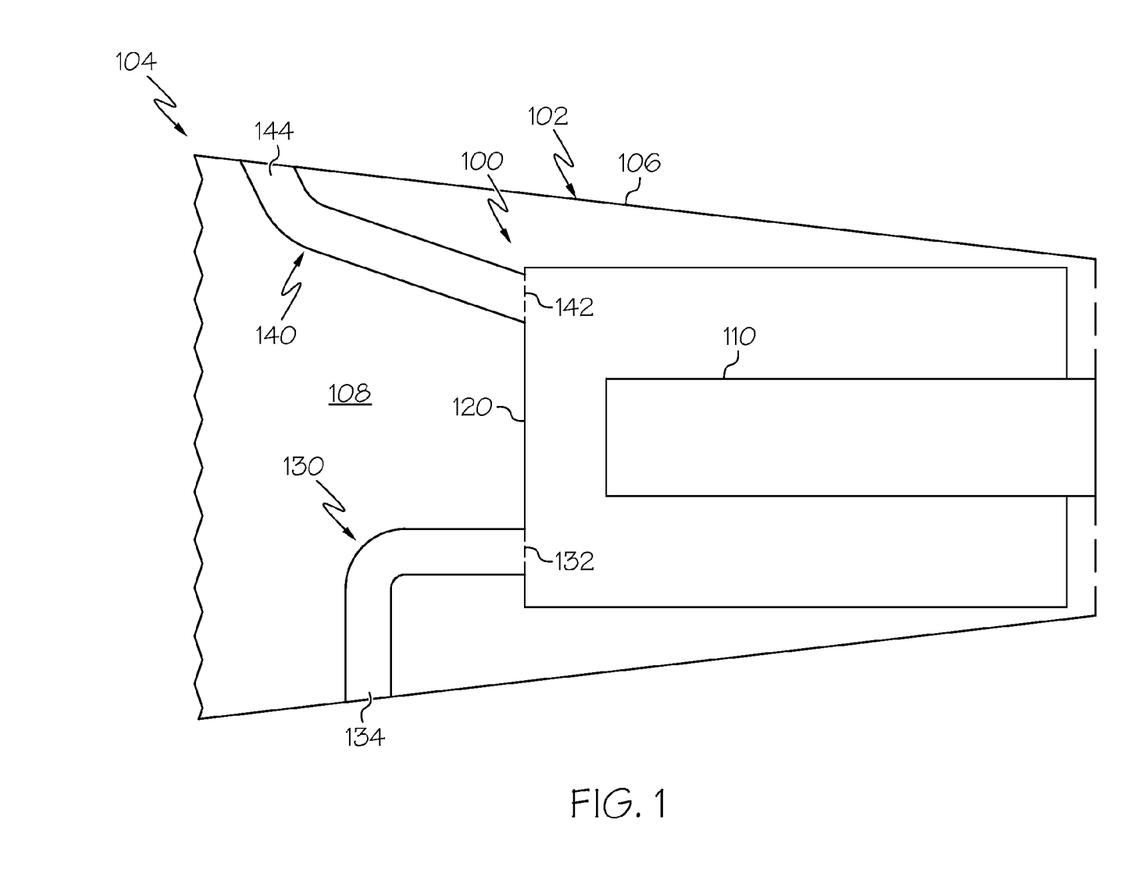
FIG. 1 is a schematic cross-sectional view of an auxiliary power unit system mounted in a tailcone of an aircraft in accordance with an exemplary embodiment.

FIG. 1 is a schematic cross-sectional view of an auxiliary power unit system 100 mounted in a tailcone 102 of an aircraft 104 in accordance with an exemplary embodiment. The aircraft can be, for example, an airplane. As shown, the tailcone 102 of the aircraft 104 has an exterior wall 106 defining an interior compartment 108 in which the auxiliary power unit system 100 is arranged.

As described below, the auxiliary power unit system 100 includes an auxiliary power unit 110, an enclosure 120, and one or more duct assemblies 130, 140. The auxiliary power unit 110 has an overall construction and operation that is generally understood by persons skilled in the art. The auxiliary power unit 110 may include, as examples, a starter-generator, a compressor section, a combustion section, a turbine section, and an exhaust section, as well as gearboxes and various accessory systems. As one example, air entering the auxiliary power unit 110 may be compressed in the compressor section, and a portion of the compressed air may be extracted for pneumatic power. The remainder of the compressed air is mixed with fuel and ignited in the combustion section, and the resulting combustion gases may be directed through the turbine section for energy extraction, which in turn, may be used to drive the compressor section and/or generate electrical power in the starter-generator unit. After work is extracted, the combustion gases may be discharged via the exhaust section.

As introduced above, the auxiliary power unit 110 is positioned inside an enclosure 120. The auxiliary power unit 110 may be arranged within the enclosure 120 in any suitable manner, including struts and mounts (not shown). Similarly, the enclosure 120 may be mounted in the tailcone compartment 108 in any suitable manner, including struts and mounts (not shown).

The enclosure 120 may function to partition the tailcone compartment 108, and additional enclosures or partitions may be arranged within the compartment 108. In one exemplary embodiment, the enclosure 120 is a fire containment structure or firebox that functions to contain a fire event in the auxiliary power unit 110 from spreading out of the enclosure 120, into the other portions of the tailcone compartment 108 and other portions of the aircraft 104. In one exemplary embodiment, the enclosure 120 may be formed by stainless steel. Other exemplary materials may be discussed in Federal Aviation Document (FAA) AC20-135, which is incorporated herein by reference.

Even though the auxiliary power unit 110 is arranged within the enclosure 120, the auxiliary power unit 110 requires air as a working and/or cooling fluid. As such, the system 100 further includes the intake duct assemblies 130, 140 that extend between the enclosure 120 and the exterior wall 106 of the tailcone 102. In particular, the first intake duct assembly 130 extends between an opening 132 in the enclosure 120 and an opening 134 in the exterior wall 106, and the second intake duct assembly 140 extends between an opening 142 in the enclosure 120 and an opening 144 in the exterior wall 106. During operation, the intake duct assemblies 130, 140 form air passages that receive air from outside of the aircraft 104 and deliver the air to the auxiliary power unit 110. The air provided via the intake duct assemblies 130, 140 may be used for various purposes. In one exemplary embodiment, the intake duct assemblies 130, 140 may be used to deliver cooling air to the auxiliary power unit 110, including compartment cooling and generator cooling air. In further embodiments, the intake duct assemblies 130, 140 may be used to deliver working air to the auxiliary power unit 110.

In some exemplary embodiments, the intake duct assemblies 130, 140 extend through the respective openings 132, 142 to a position at, or proximate to, the auxiliary power unit 110. The openings 132, 142 may be arranged at any position on any wall of the enclosure 120, and similarly, the openings 134, 144 may be arranged at any circumferential or forward/aft position on the exterior wall 106 of the tailcone 102. Although two intake duct assemblies 130, 140 are depicted in FIG. 1, other embodiments may only include a single intake duct assembly or may include additional intake duct assemblies. Additional details about intake duct assembly 130 are provided below, although the discussion below may also be applicable to other types of duct assemblies, including intake duct assembly 140, exhaust duct assemblies (not shown), and duct assemblies for components such as wiring.

Figure 2:
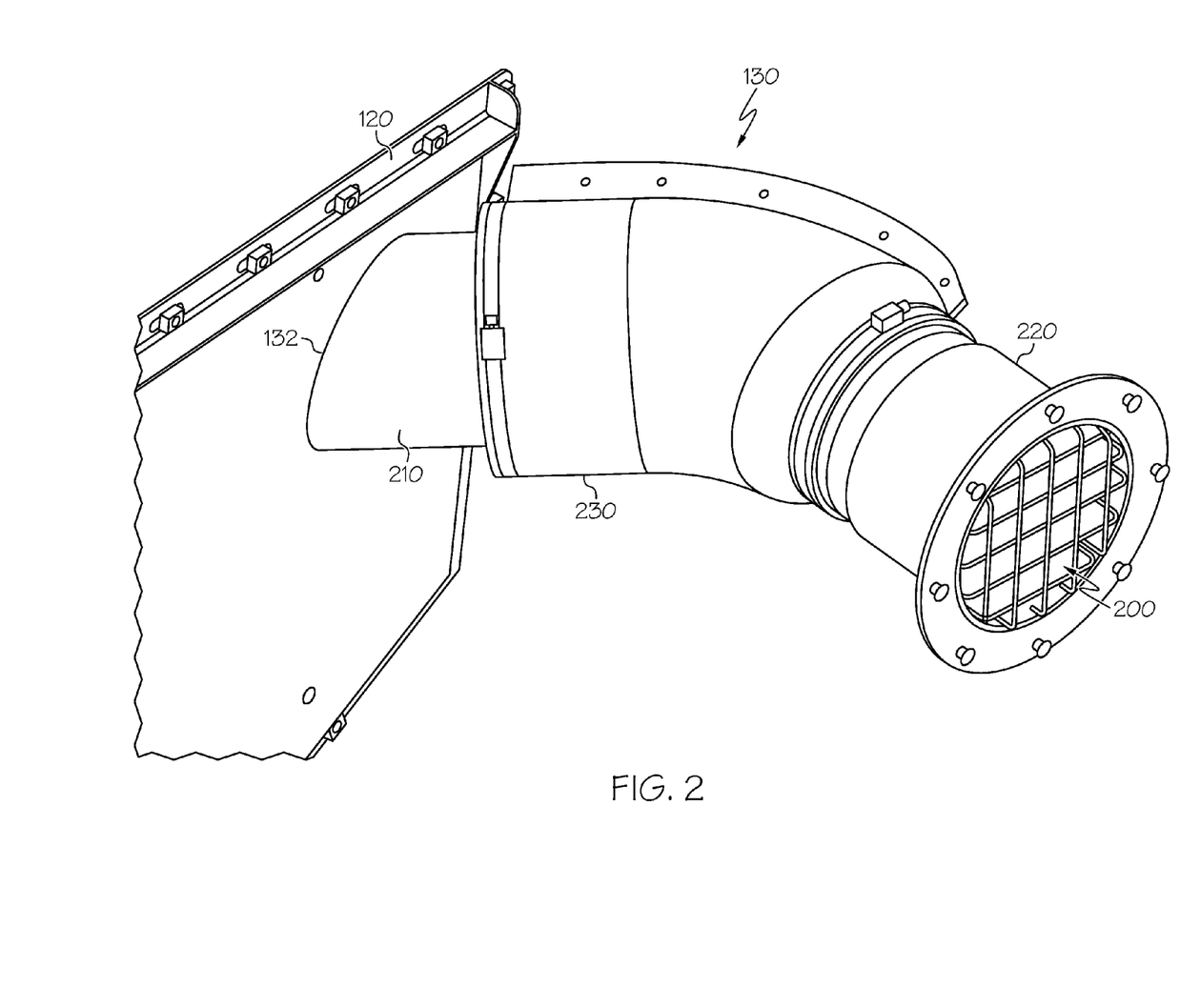
FIG. 2 is an isometric view of a cooling air intake duct assembly of the auxiliary power unit system of FIG. 1 in accordance with an exemplary embodiment.

FIG. 2 is an isometric view of the intake duct assembly 130 that extends between the enclosure 120 (one side of which is shown in FIG. 2) and the exterior wall 106 of the aircraft 104 (not shown in FIG. 2). As noted above, the intake duct assembly 130 forms a main passage 200 to direct air between the exterior wall 106 (FIG. 1) and enclosure 120. The main passage 200 may have any suitable diameter, such as for example, approximately 2.25 inches, 4.25 inches, and larger or smaller diameters. In this exemplary embodiment, the intake duct assembly 130 includes a first inlet adapter 210, a second inlet adapter 220, and a fire containment apparatus 230. The first inlet adapter 210 is mounted on the enclosure 120 at opening 132, and the second inlet adapter 220 is mounted on the exterior wall 106 (FIG. 1).

The fire containment apparatus 230 extends between the first and second inlet adapters 210, 220. The fire containment apparatus 230 may be any length and generally dependent on the distance between the enclosure 120 and exterior wall 106, as well as the lengths of the inlet adapters 210, 220. In one exemplary embodiment, the fire containment apparatus 230 has a length of approximately 8 inches.

The fire containment apparatus 230 performs a number of functions. First, the fire containment apparatus 230 forms part of the intake duct assembly 130, and thus, forms part of the passage 200 that directs intake air from outside of the exterior wall 106 (FIG. 1) to the auxiliary power unit 110 (FIG. 1) by fluidly coupling together the first and second inlet adapters 210, 220. Further, the fire containment apparatus 230 is manufactured with flexible materials to accommodate relative movement of the enclosure 120 and the exterior wall 106 and to simplify assembly Additionally, as will be described in greater detail below, the fire containment apparatus 230 functions to improve containment of a fire event originating within the enclosure 120 from traveling outside of the enclosure 120 via the intake duct assembly 130.

Figure 3:
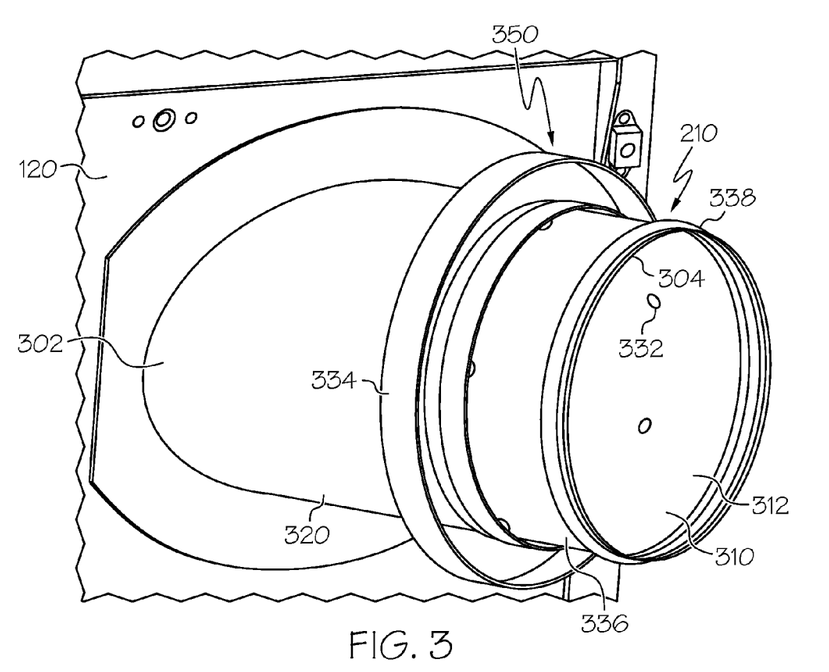
FIG. 3 is an isometric view of a first inlet adapter of the intake duct assembly of FIG. 2 in accordance with an exemplary embodiment.
Figure 4:
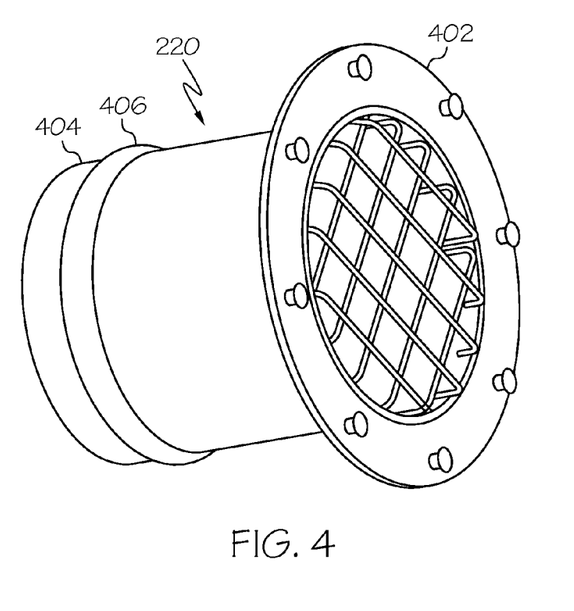
FIG. 4 is an isometric view of a second inlet adapter of the intake duct assembly of FIG. 2 in accordance with an exemplary embodiment.

Reference is briefly made to FIGS. 3 and 4, which are isometric views of the first and second inlet adapters 210, 220, respectively, without the fire containment apparatus 230. In particular, FIG. 3 is the isometric view of the first inlet adapter 210. As shown, the first inlet adapter 210 has the form of a stub duct or relatively short cylindrical duct that is mounted on the enclosure 120 in any suitable manner to direct air flow to the auxiliary power unit 110 (FIG. 1). A first end 302 of the first inlet adapter 210 is mounted on the enclosure 120, and a second end 304 of the first inlet adapter 210 is configured to receive the fire containment apparatus 230 (FIG. 2).

The cylindrical wall of the first inlet adapter 210 defines inner and outer surfaces 310, 320. Other cross-sectional shapes are possible. The inner surface 310 forms an interior cavity 312, and thus, a portion of the passage 200 for the intake air flowing through the adapter 210. The first inlet adapter 210 further includes a series of holes 332 arranged in a row around the circumference, generally on the second end 304 of the first inlet adapter 210. Each of the holes 332 extends through the inner and outer surfaces 310, 320. In one exemplary embodiment, each hole 332 has a circular cross-sectional shape, although other shapes may be provided for the holes 332, including slots. Any number of holes 332 may be provided, including additional rows. In the depicted embodiment of FIG. 3, approximately eight (8) holes 332 extend about the circumference of the first inlet adapter 210, 220. The function of the holes 332 is discussed in greater detail below.

As also discussed in greater detail below, the holes 332 separate a first mounting area 334 and a second mounting area 336 on the first inlet adapter 210, generally on the second end 304 of the first inlet adapter 210 that receives the fire containment apparatus 230 (FIG. 2). In this exemplary embodiment, an isolation shield 350 is provided on the outer surface 320 of the first inlet adapter 210. The isolation shield 350 defines the first mounting area 334 for a portion of the fire containment apparatus 230 (FIG. 2). As shown, the isolation shield 350, and thus the first mounting area 334, is proximate to the holes 332 on the side of the inlet adapter 210 closest to the enclosure 120 (or the downstream side, if referring to the direction of air through the adapter 210). Additional details about the isolation shield 350 are provided below. The second mounting area 336 is formed on the outer surface 320 of the first inlet adapter 210 on the other side of the holes 332 (or the upstream side, if referring to the direction of air through the adapter 210). The first inlet adapter 210 further includes a protrusion or lip 338 extending about the circumference of the first inlet adapter 210, generally in the second mounting area 336. The first inlet adapter 210 may be formed by any suitable material, such as stainless steel.

FIG. 4 is an isometric view of the second inlet adapter 220. The second inlet adapter 220 also has the form of a stub duct or relatively short cylindrical duct with a first end 402 mounted on the exterior wall 106 (FIG. 1) in any suitable manner and a second end 404 configured to receive the fire containment apparatus 230 (FIG. 1). Other cross-sectional shapes are possible. The second inlet adapter 220 may additionally define a protrusion 406 extending circumferentially around the second end 404. As noted above, the second inlet adapter 220 is configured to direct air from outside of the aircraft to the fire containment apparatus 230 (FIG. 1). Although not shown, in some embodiments, the second inlet adapter 220 may additionally include or receive additional duct portions, e.g., additional fire containment apparatuses, similar or dissimilar to apparatus 230 (FIG. 1). The second inlet adapter 220 may be formed by any suitable material, which may include stainless steel or aluminum, if such a material is appropriate for testing and performance requirements.

Figure 5:
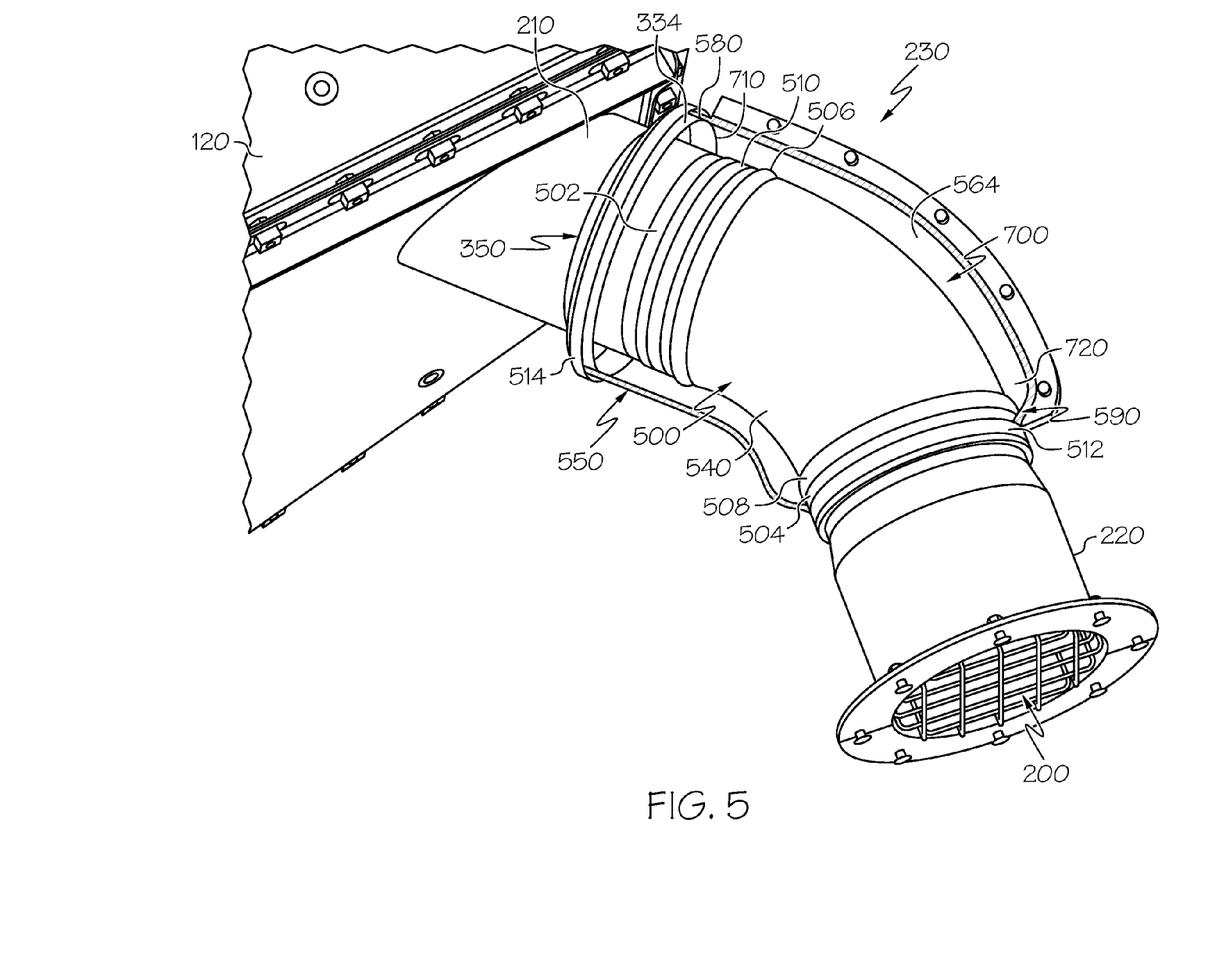
FIG. 5 is a partial isometric view of the intake duct assembly of FIG. 2 in accordance with an exemplary embodiment.

FIG. 5 is a partial isometric view of the intake duct assembly 130 with a portion of the fire containment apparatus 230 removed. The fire containment apparatus 230 is formed by an inner duct 500 and an outer sheath 550. In FIG. 5, a portion of the outer sheath 550 has been removed to show the inner duct 500. Although the an inner duct 500 and the outer sheath 550 are depicted as separate components, the inner duct 500 and the outer sheath 550 may be integrated as a single unit fire containment apparatus.

As shown, the inner duct 500 has a first end 502 fluidly coupled to the first inlet adapter 210 and a second end 504 fluidly coupled to the second inlet adapter 220. Generally, FIG. 5 depicts the outer surface 540 of the inner duct 500, while the inner surface of the inner duct 500 forms part of the passage 200 that directs intake air through the fire containment apparatus 230 between the first and second inlet adapters 210, 220. As such, the inner duct 500 generally has a size and shape similar to that of the inlet adapters 210, 220. In one exemplary embodiment, the inner duct 500 is formed by a flexible material, such as silicone rubber.

As will be discussed in greater detail below, the first end 502 of the inner duct 500 is mounted to the first inlet adapter 210 at the second mounting area 336, which is upstream of the holes 332 (FIG. 3). The first end 502 of the inner duct 500 may be secured to the first inlet adapter 210 in any suitable manner, including a clamp 510, as shown in FIG. 5. The first end 502 of the inner duct 500 may define a protrusion 506 that matches the protrusion 338 (FIG. 3) of the first inlet adapter 210. The matching protrusions 506, 338 may function to appropriately position the inner duct 500 on the first inlet adapter 210.

The second end 504 of the inner duct 500 is mounted to the second inlet adapter 220. The second end 504 of the inner duct 500 may be secured to the second inlet adapter 220 in any suitable manner, including a clamp 512, as shown in FIG. 5. The second end 504 of the inner duct 500 may define a protrusion 508 that matches the protrusion 406 (FIG. 4) of the second inlet adapter 220. The matching protrusions 508, 406 may function to appropriately position the inner duct 500 on the second inlet adapter 220. Additional details about the mounting of the inner duct 500 will be provided below.

The outer sheath 550 circumscribes and extends around the inner duct 500. As noted above, in the view of FIG. 5, a portion of the outer sheath 550 has been removed to illustrate the inner duct 500. Details about the mounting of the outer sheath 550 are provided below.

Figure 6:
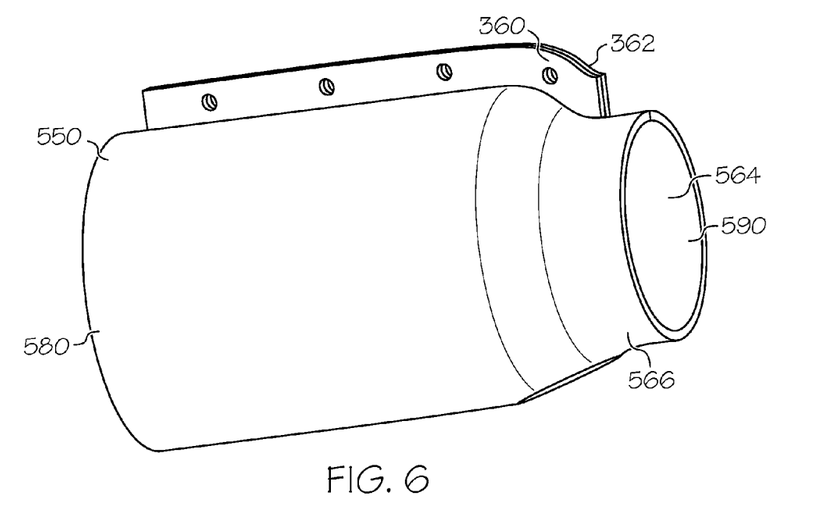
FIG. 6 is an isometric view of a sheath portion of the intake duct assembly of FIG. 2 in accordance with an exemplary embodiment.

Reference is briefly made to FIG. 6, which is an isometric view of the outer sheath 550 removed from other portions of the intake duct assembly 230. In this embodiment, the outer sheath 550 is formed as a single piece that is split along the length. Flanges 360, 362 radially extend from the split. As such, for installation around the inner duct 500, the outer sheath 550 may be opened at the split and subsequently secured by fastening together the flanges 360, 362, e.g., with a screw or clamp. The single unit outer sheath 550 of this exemplary embodiment may reduce the part count over the overall design.

As shown in FIG. 6, the outer sheath 550 has an inner surface 564 that defines an interior volume, which is discussed below relative to the inner duct 500, and an opposing outer surface 566. The outer sheath 550 further has a first end 580 and a second end 590 for respectively mounting the outer sheath 550 to the first and second inlet adapters 210, 220, as described below.

In one exemplary embodiment, the outer sheath 550 is formed by a flexible material, such as silicone rubber or elastomer. Other materials may be provided. In one exemplary embodiment, the outer sheath 550 is formed by or incorporated with fire-proof or fire-resistant materials, the function of which is discussed below. For example, the outer sheath 550 may be formed by a silicone elastomer and reinforced by fibers, such as ceramic or fiberglass. Such fibers may be incorporated into the inner surface 564 of the outer sheath 550 in a layered arrangement to improve fire containment characteristics.

Returning to FIG. 5, the first end 580 of the outer sheath 550 is mounted on the first mounting area 334 of the isolation shield 350 on the first inlet adapter 210 with a clamp 514, although any suitable technique may be provided. The second end 590 of the outer sheath 550 is mounted to the outer surface of the second inlet adapter 220 with the clamp 512 that also secures the inner duct 500. In further embodiments, the second end 590 may be secured with a separate clamp. Generally, and as discussed in greater detail below, the outer sheath 550 has a greater length than the inner duct 500 to completely enclose the inner duct 500, particularly by extending beyond the inner duct 500 at the first inlet adapter 210.

Figure 7:
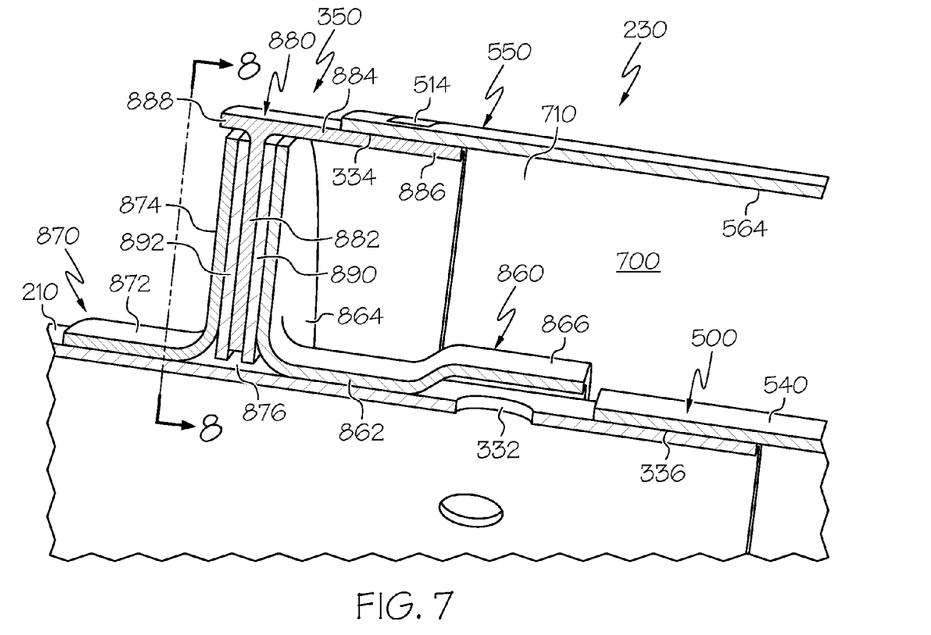
FIG. 7 is a partial cross-sectional view of the first inlet adapter and a fire containment apparatus of FIG. 2 in accordance with an exemplary embodiment.

FIG. 7 is partial more detailed cross-sectional view of the interface between the first inlet adapter 210 and the fire containment apparatus 230. As noted above, and as shown in FIGS. 5 and 7, the inner duct 500 is mounted on the second mounting area 336 of the first inlet adapter 210 such that the inner duct 500 is fluidly coupled to the first inlet adapter 210 upstream of the holes 332.

The outer sheath 550 is mounted on the first inlet adapter 210 at the first mounting area 334 on isolation shield 350 downstream of the holes 332. In particular, the outer sheath 550 forms a seal with the isolation shield 350, which in turn, forms a seal with the outer surface 320 of the first inlet adapter 210. As a result of this arrangement, the holes 332 are arranged in between the mounting positions of the inner duct 500 and the outer sheath 550.

As also shown in FIGS. 5 and 7, a barrier annulus 700 is formed as a result of the relative arrangement of the inner duct 500 and the outer sheath 550. In particular, the barrier annulus 700 is formed by the outer surface 540 of the inner duct 500 and the inner surface 564 of the outer sheath 550. The barrier annulus 700 extends between first and second ends 710, 720. The first end 710 is formed at the seals between the outer sheath 850 and isolation shield 350 and between isolation shield 350 and the first inlet adapter 210. The second end 720 is formed at the seal between the second end 504 of the outer sheath 550 and the second inlet adapter 220. As such, the barrier annulus 700 has closed ends 710, 720 to define a generally closed space, except for the holes 332 in fluid communication with the passage 200. Additional details about the operation of the intake duct assembly 130, particularly the fire containment apparatus 230, will be discussed below after a description of the isolation shield 350.

Referring to FIG. 7, the isolation shield 350 is formed by a first bracket 860, a second bracket 870, a collar member 880, and insulation members 890, 892. The first bracket 860, the second bracket 870, the collar member 880, and the insulation members 890, 892 are annular in nature and extend around the circumference of the first inlet adapter 210.

The first bracket 860 is generally configured as an L-shaped bracket with first and second legs 862, 864 and a raised flange 866 extending from the first leg 862. As shown, the first leg 862 forms a base that is secured to the first inlet adapter 910. The first leg 862 is positioned such that the raised flange 866 extends over the holes 332. The raised flange 866 has a height such that the holes 332 are not blocked and a flow path between the barrier annulus 700 and the interior of the first inlet adapter 210 is maintained. The second leg 864 extends perpendicularly to the first leg 862.

The second bracket 870 is generally configured as an L-shaped bracket with first and second legs 872, 874. As shown, the first leg 872 forms a base that is secured to the first inlet adapter 910. The second leg 874 extends perpendicularly to the first leg 872. The second bracket 870 is positioned on the first inlet adapter 210 such that the second leg 874 of the second bracket 870 and the second leg 864 of the first bracket 860 define an axial space 876 that extends about the circumference of the first inlet adapter 910.

The collar member 880 is generally T-shaped with perpendicular first and second flanges 882, 884. The collar member 880 is generally arranged such that the first flange 882 is oriented parallel to the second legs 864, 874 of the brackets 860, 870 within the axial space 876. As shown, the insulation member 890 is positioned (or sandwiched) between the second leg 864 of the first bracket 860, and the insulation member 892 is positioned (or sandwiched) between the second leg 874 of the second bracket 870. As described in greater detail below, the second legs 864, 874, insulation members 890, 892, and/or first flange 882 have lengths such that the first flange 882 does not directly contact the outer surface of the first inlet adapter 210.

As a result of this orientation, the second flange 884 of the collar member 880 is parallel to the first inlet adapter 910. Additionally, the second flange 884 has a first portion 886 that extends over insulation member 890 and the second leg 864 of the first bracket 860 and a second portion 888 that extends over insulation member 892 and the second leg 874 of the second bracket 870.

The second flange 884 of the collar member 880 has an outer surface that forms the mounting surface 334 for the outer sheath 550. As such, upon assembly, the upstream end of the outer sheath 550 is secured to the outer surface 894 of the collar member 880 with, for example, the clamp 514, as depicted in FIG. 7.

Figure 8:
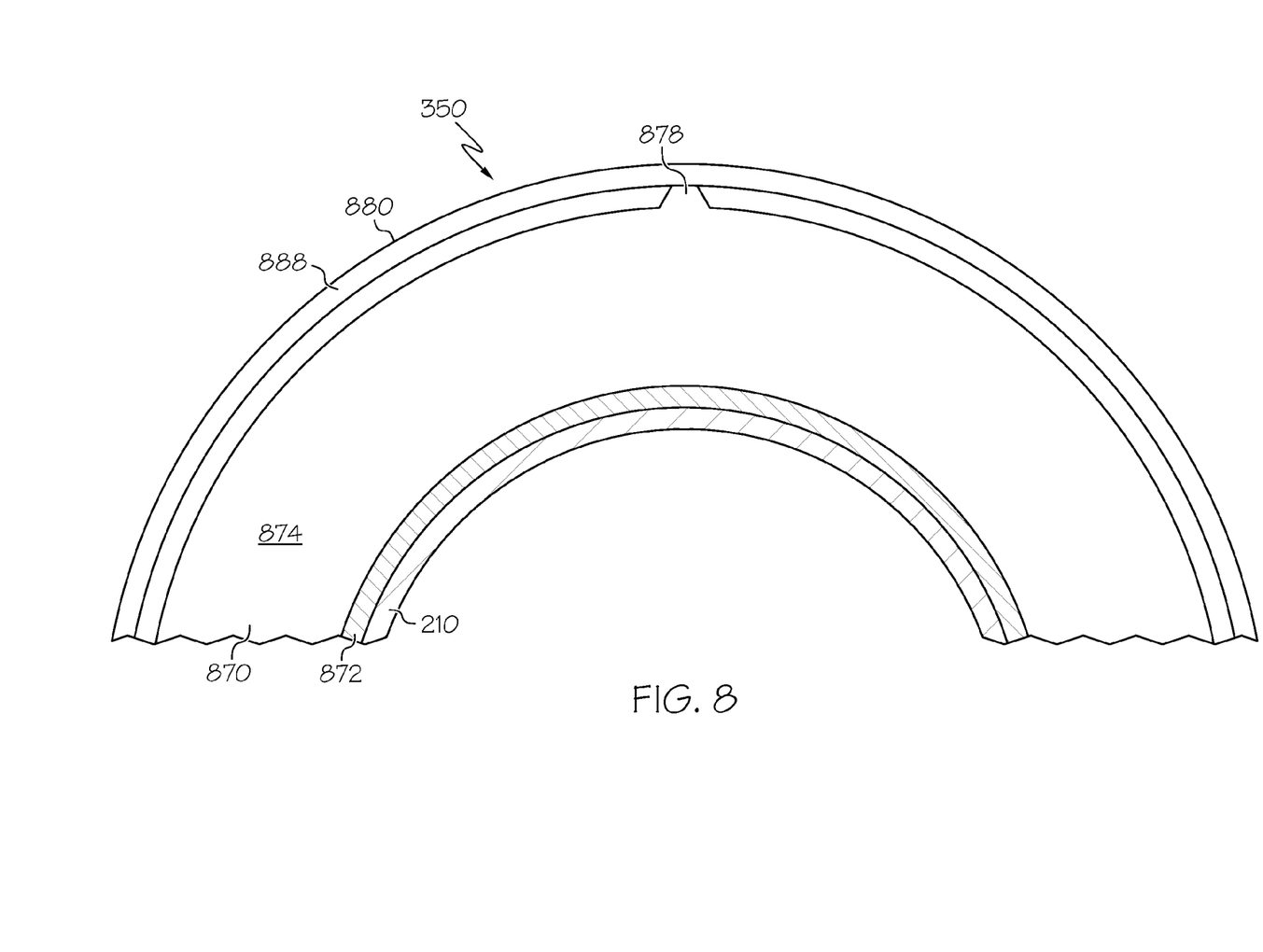
FIG. 8 is a partial cross-sectional view of the first inlet adapter and an isolation shield through line 8-8 of FIG. 7.

As introduced above, the brackets 860, 870 are configured to have reduced or minimal contact with the collar member 880. In particular, insulation members 890, 892 separate the brackets 860, 870 from the collar member 880 in an axial direction. The insulation materials 890, 892 may be formed by any suitable material to minimize heat transfer, including a flame-resistant aramid or ceramic material. Additionally, the ends of the second legs 864, 874 may have outer circumferences that minimize contact with the collar member 880. Reference is additionally made to FIG. 8, which is a partial cross-sectional view of the first inlet adapter 210 and isolation shield 350 through line 8-8 of FIG. 7. FIG. 8 depicts portions of the first and second legs 872, 874 of the second bracket 870, the collar member 880, and the first inlet adapter 210. As shown, the outer circumference at the edge of the second leg 874 may have one or more protrusions 878 (one of which is shown) extending a radial direction. The protrusions 878 function to radially support the underside of the collar member 880 while minimizing contact points between the second bracket 870 and the collar member 880. These protrusions 878 may also function to maintain the spacing between the first flange 882 of the collar member 880 and the outer surface of the first inlet adapter 210. In some embodiments, the second leg 864 of the first bracket 860 may have similar protrusions to perform the same function. Operation of the intake duct assembly 130, particularly the fire containment apparatus 230, will now be described.

During normal operation, air from outside of aircraft flows through the main passage 200 into the enclosure 120 for use by the auxiliary power unit 110. Due to the closed nature of the barrier annulus 700, intake air flowing through passage 200 typically does not flow into or out of the barrier annulus 700 through the holes 332 during normal operation.

However, in some situations, a fire event may originate within the enclosure 120, typically from the auxiliary power unit 110. Although the enclosure 120 is generally fire-proof, the fire may attempt to spread out of the enclosure 120 via the opening 132 that admits the intake air from the intake duct assembly 130. In such an event, the intake duct assembly 130 functions to assist containment of the fire within the enclosure 120 and/or the duct assembly 130.

During a fire event, temperatures within the main passage 200 may increase. Similarly, the temperature of the first inlet adapter 210 may increase due to proximity with the opening 132 in the enclosure 120. In some situations, temperatures increase such that the inner duct 500 begins to melt, burn, or otherwise break down to generate combustion gases, particularly at the interface between the inner duct 500 and the first inlet adapter 210. As a result, combustion gases generated by or from the inner duct 500 tend to form in the barrier annulus 700. As an example, such combustion gases may include volatile organic compounds (VOCs) being burned off the inner duct 500. As time passes and additional combustion gases are generated, pressure within the barrier annulus 700 increases such that the combustion gases in the barrier annulus 700 flow from the barrier annulus 700, through the holes 332, and back into the main passage 200 due to the resulting pressure differential. The closed ends of the barrier annulus 700 result in the holes 332 being the only manner by which air and/or combustion products exit the barrier annulus 700.

By venting the combustion products back into the main passage 200, the temperature of the outer sheath 550 may be maintained in an acceptable range such that the structural integrity of the outer sheath 550 is correspondingly maintained. As air leaves the barrier annulus 700, the amount of oxygen within the barrier annulus 700 is reduced, thereby inhibiting further combustion of the inner duct 500 and/or any combustion of the outer sheath 550. Maintaining the structural integrity of the outer sheath 550 enables containment of the fire event, even if the inner duct 500 is breached, since the outer sheath 550 encloses the inner duct 500.

The fire containment function may be further assisted or enabled by the isolation member 350. In particular, the isolation shield 350 functions to minimize heat transfer between the first inlet adapter 210 and the outer sheath 550. As noted above, the collar member 880 does not contact the first inlet adapter 210. Moreover, as also noted above, heat transfer between the first inlet adapter 210 and outer sheath 550 through the brackets 860, 870 is minimized by minimizing contact between the outer sheath 550 and brackets 860, 870 as a result of the insulation members 890, 892 and the protrusions 878 on the outer circumference of the second leg 874 of the second bracket 870. As a result, unacceptable heat transfer does not occur between the first inlet adapter 210 and the outer sheath 550. As such, even if the fire event in the enclosure 120 and/or the first inlet adapter 210 substantially increases the temperature of the first inlet adapter 210, the temperature of the outer sheath 550 may be maintained in an acceptable range because thermal conduction to the outer sheath 550 is minimized. Moreover, inhibiting heat transfer between the first inlet adapter 210 and the outer sheath 550 also functions to maintain the seal of the outer sheath 550 relative to the first inlet adapter 210, thereby maintaining the closed end of the barrier annulus 700, and thus, the overall closed nature of the fire containment apparatus 230. Additionally, bracket 860 includes the raised flange 866, which may function to provide additional protection to the holes 332 during a fire event, although the raised flange 866 may be omitted.

FIGS. 9-13 depict additional and/or alternative exemplary embodiments of an intake duct assembly 830 similar to the intake duct assembly 130 discussed above. Unless otherwise noted, the characteristics of the intake duct assembly 130 discussed above are identical to the intake duct assembly 830 discussed below.

Figure 9:
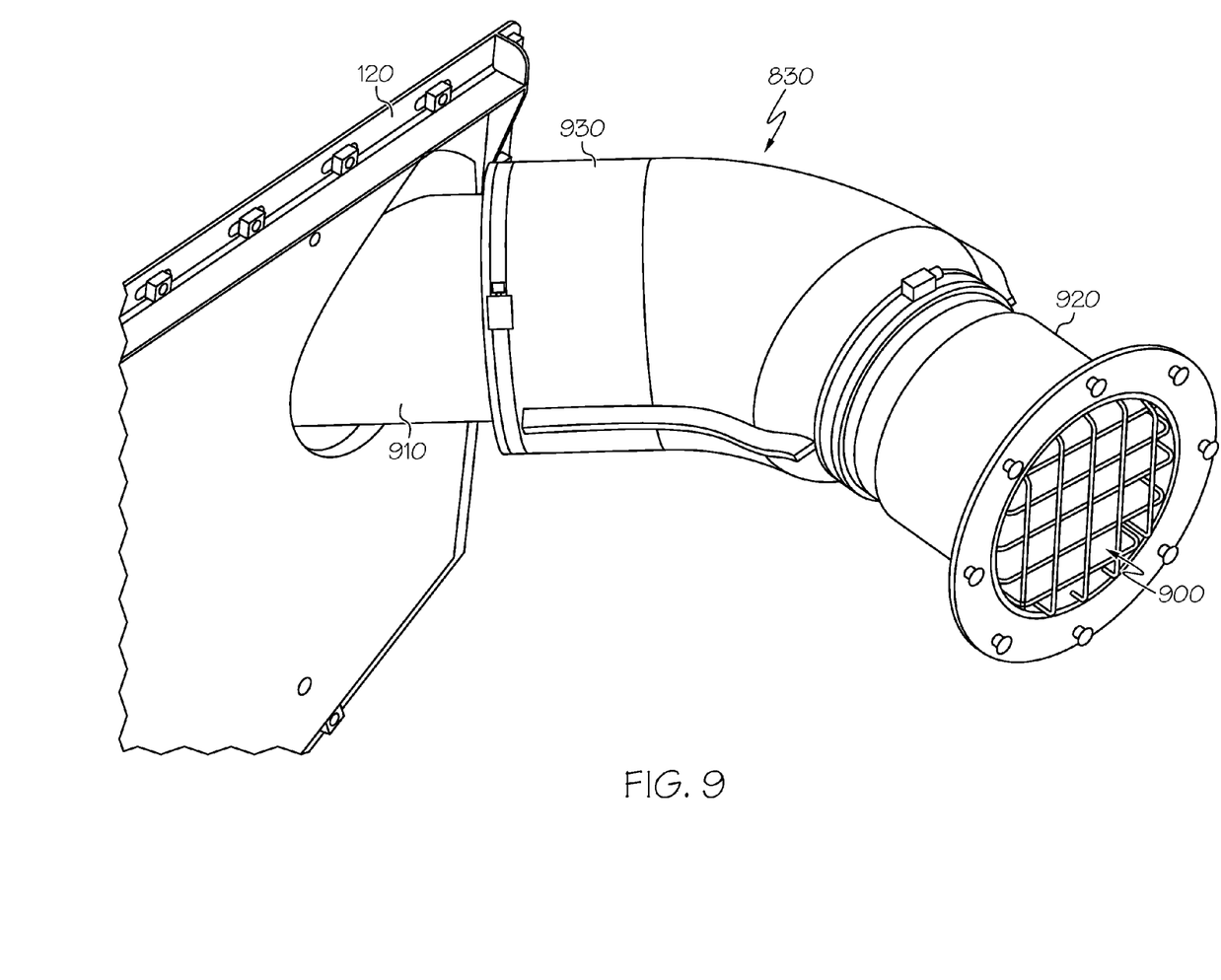
FIG. 9 is an isometric view of an intake duct assembly in accordance with a further exemplary embodiment.

FIG. 9 is an isometric view of the intake duct assembly 830 that extends between the enclosure 120 and the exterior wall 106 of the aircraft 104 (FIG. 1) to form a main passage 900 for intake air. As above, the intake duct assembly 830 includes a first inlet adapter 910, a second inlet adapter 920, and a fire containment apparatus 930 extending between the adapters 910, 920.

Figure 10:
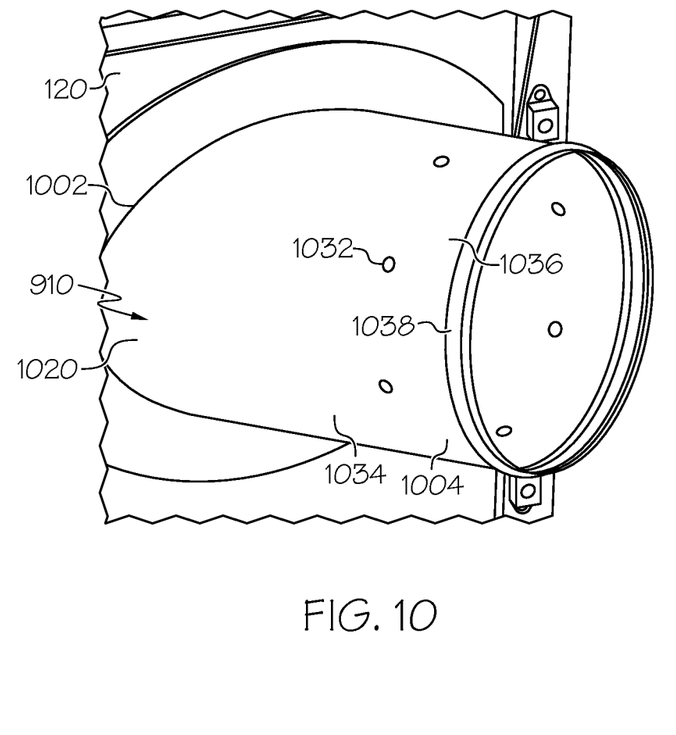
FIG. 10 is an isometric view of a first inlet adapter of the intake duct assembly of FIG. 9 in accordance with a further exemplary embodiment.

Reference is briefly made to FIG. 10, which is an isometric view of the first inlet adapter 910 without the fire containment apparatus 930. As above, the first inlet adapter 910 is mounted on the enclosure 120 in any suitable manner to direct air flow to the auxiliary power unit 110 (FIG. 1). A first end 1002 of the first inlet adapter 910 is mounted on the enclosure 120, and a second end 1004 of the first inlet adapter 910 is configured to receive the fire containment apparatus 930 (FIG. 9). As also shown in FIG. 10, a series of holes 1032 is arranged in a row around the circumference of the first inlet adapter 910, generally on the second end 1004. As above, the holes 1032 separate a first mounting area 1034 and a second mounting area 1036 on an outer surface 1020 of the first inlet adapter 910. In particular, the first mounting area 1034 is proximate to the holes 1032 on the side of the inlet adapter 910 closest to the enclosure 120 (or the downstream side, if referring to the direction of air through the adapter 210), and the second mounting area 1036 is on the other side of the holes 1032 (or the upstream side, if referring to the direction of air through the adapter 910). The first inlet adapter 910 further includes a protrusion or lip 1038 extending about the circumference of the first inlet adapter 910, generally in the second mounting area 1036.

Figure 11:
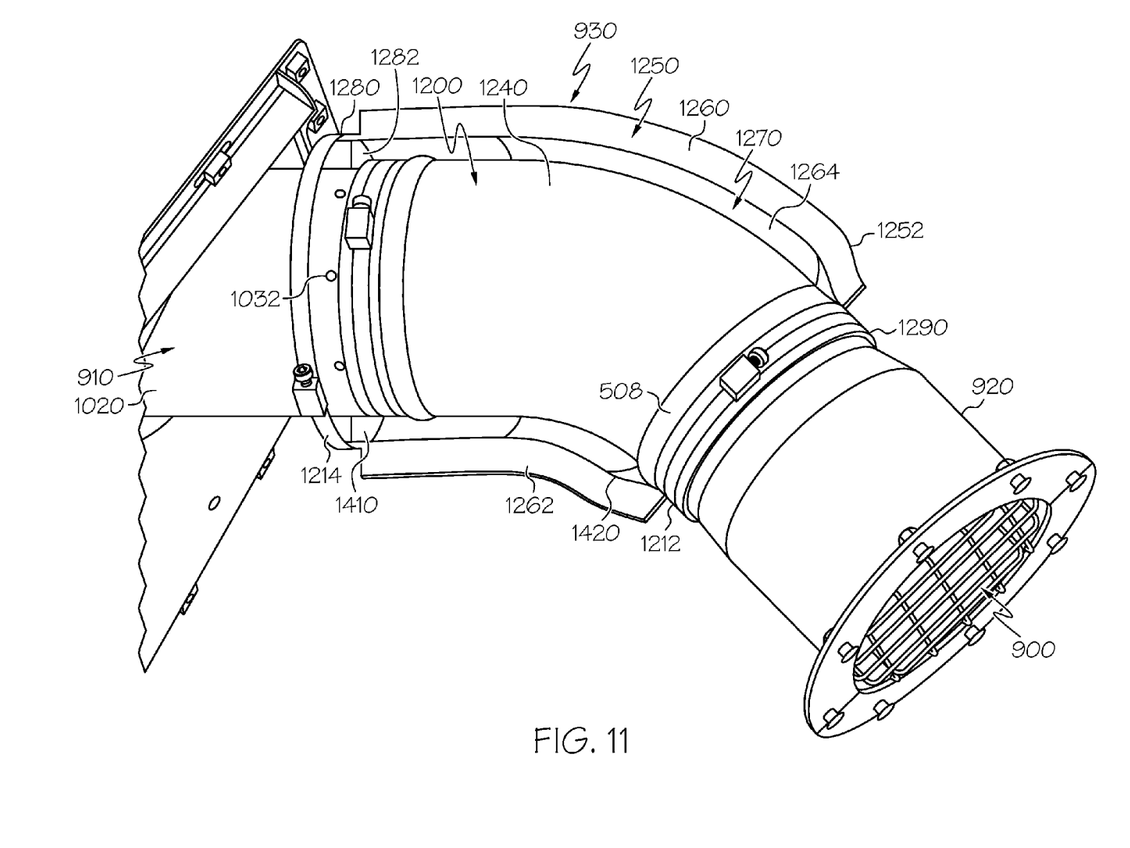
FIG. 11 is an partial, isometric view of the intake duct assembly of FIG. 9 with a portion of the outer sheath removed in accordance with a further exemplary embodiment.

FIG. 11 is an isometric view of the intake duct assembly 830 similar to that of FIG. 9, except that a portion of the fire containment apparatus 930 has been removed. As above, the fire containment apparatus 930 is formed by an inner duct 1200 and an outer sheath 1250. The inner duct 1200 is mounted to the first and second inlet adapters 910, 920, and the outer sheath 1250 extends around the inner duct 1200 to form the barrier annulus 1270.

The outer sheath 1250 circumscribes and extends around the inner duct 1200. In this exemplary embodiment, the outer sheath 1250 is formed by more than one sheath portion 1252. Each sheath portion 1252 extends the entire length between the inlet adapters 910, 920, but only for a portion of the circumference. In FIG. 11, one such sheath portion 1252 is depicted, and one or more sheath portions 1252 have been removed to more clearly show the inner duct 1200. In this exemplary embodiment, the depicted sheath portion 1252 extends approximately half-way around the circumference of the inner duct 1200 and a similar sheath portion completes the outer sheath 1250 to surround the inner duct 1200, such as shown in FIG. 9. The sheath portions 1252 may have one or more flanges 1260, 1262 that enable such portions to be coupled together Reference is briefly made to FIG. 12, which is an isometric view of the sheath portion 1252 removed from the other portions of the fire containment apparatus 930. Generally, the features of the sheath portion 1252 correspond to similar or identical features on further sheath portions that collectively make up the outer sheath 1250 of the fire containment apparatus 930.

Figure 12:
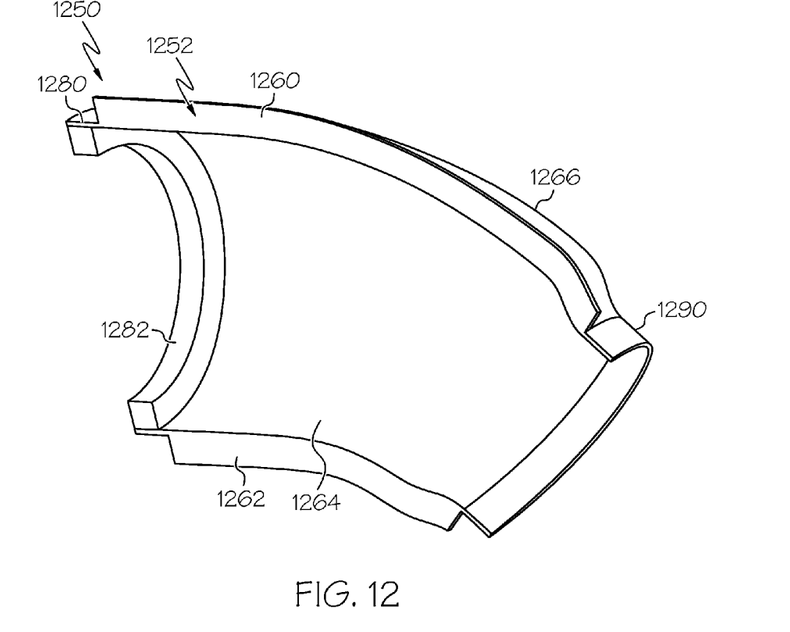
FIG. 12 is an isometric view of the outer sheath of the intake duct assembly of FIG. 9 in accordance with a further exemplary embodiment.

As shown in FIG. 12, the outer sheath 1250 has an inner surface 1264 that defines an interior volume, which is discussed below relative to the inner duct 1200, and an opposing outer surface 1266. The outer sheath 1250 further has a first end 1280 and a second end 1290 for respectively mounting the outer sheath 1250 to the first and second inlet adapters 910, 920, as described below. A collar member 1282 is integrated with, or arranged on, the inner surface 1264 at the first end 1280 to form the interface between the outer sheath 1250 and the first inlet adapter 910, as also discussed in greater detail below.

Returning to FIG. 11, the first end 1280 of the outer sheath 1250 is mounted to the outer surface 1020 of the first inlet adapter 910 with a clamp 1214, although any suitable technique may be provided. The second end 1290 of the outer sheath 550 is mounted to the outer surface of the second inlet adapter 920 with a clamp 1212 that may also secure the inner duct 1200.

Figure 13:
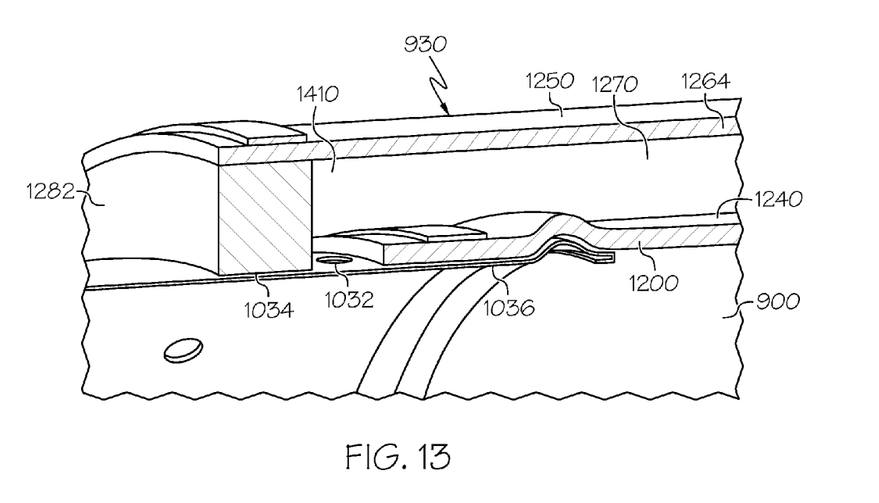
FIG. 13 is a partial, more detailed cross-sectional view of a portion of the intake duct assembly of FIG. 9 in accordance with a further exemplary embodiment.

FIG. 13 is partial more detailed cross-sectional view of the interface between the first inlet adapter 910 and the fire containment apparatus 930. As noted above, and as shown in FIGS. 11 and 13, the inner duct 1200 is mounted on the second mounting area 1036 of the first inlet adapter 910 such that the inner duct 1200 is fluidly coupled to the first inlet adapter 910 upstream of the holes 1032. The outer sheath 1250 is mounted on the first inlet adapter 910 at the first mounting area 1034 downstream of the holes 1032. In particular, the collar 1282 is positioned on the first mounting area 1034 to form a seal with the outer surface of the first inlet adapter 910. As a result of this arrangement, the holes 1032 are arranged in between the mounting positions of the inner duct 1200 and the outer sheath 1250.

As introduced above, the barrier annulus 1270 is formed as a result of the relative arrangement of the inner duct 1200 and the outer sheath 1250. In particular, the barrier annulus 1270 is formed by the outer surface 1240 of the inner duct 1200 and the inner surface 1264 of the outer sheath 1250. The barrier annulus 1270 extends between first and second ends 1410, 1420. The first end 1410 is formed at the seal between the collar member 1282 and the first inlet adapter 910. The second end 1420 is formed at the seal between the second end 1290 of the outer sheath 1250 and the second inlet adapter 920. As such, the barrier annulus 1270 has closed ends 1410, 1420 to define a generally closed space, except for the holes 1032 in fluid communication with the passage 900.

Referring again to FIG. 11, during a fire event, the inner duct 1200 and outer sheath 1250 generally operate as discussed above. The barrier annulus 1270 is sealed, except for holes 1032, and combustion gases within the barrier annulus 1270 are vented into the main passage 900. As the combustion gases are vented, the temperature of the outer sheath 1250 may be maintained in an acceptable range. The fire containment function may be further assisted or enabled by the collar member 1282. The collar 1282 may be formed by an insulating material such that unacceptable heat transfer does not occur between the first inlet adapter 910 and the outer sheath 1250.

Accordingly, exemplary embodiments described above provide auxiliary power unit systems with intake duct assemblies that function to advantageously contain a fire originating from an auxiliary power unit. In one exemplary embodiment, the intake duct assembly described above may function to contain a fire event in accordance with FAA Advisory Circular 20-135, which is incorporated herein by reference. As an example, the intake duct assembly may be capable of withstanding a 2000° F. for 15 minutes without flame penetration or backside ignition. Although the fire containment apparatuses discussed above are described with respect to auxiliary power unit intake ducts, such apparatuses may be incorporated into other type of duct assemblies. The fire containment apparatuses may be incorporated into existing auxiliary power unit systems without requiring extensive modifications with respect to duct flexibility, weight, structure, expense, and/or aerodynamics. Each of the exemplary embodiments discussed above may be used in combination with one another. The exemplary embodiments discussed above may find beneficial use in many industries including aerospace, but also including industrial applications such as electricity generation, naval propulsion, pumping sets for gas and oil transmission, aircraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An intake duct assembly for directing intake air between an enclosure and an exterior wall of an aircraft, the interior duct assembly comprising:

a first inlet adapter configured to be mounted on a first opening through the enclosure, the first inlet adapter including a duct wall defining at least one hole through the duct wall;

a second inlet adapter configured to be mounted on a second opening through the exterior wall; and a fire containment apparatus extending between the first inlet adapter and the second inlet adapter to form a first passage to direct intake air in a downstream direction through the second opening in the exterior wall of the aircraft, through the second inlet adapter, through the fire containment apparatus, through the first inlet adapter, and into the enclosure through the first opening, the fire containment apparatus comprising:

an inner duct mounted on the first inlet adapter at a first position upstream of the at least one hole and mounted on the second inlet adapter; and an outer sheath mounted on the first inlet adapter at a second position downstream of the at least one hole and mounted on the second inlet adapter, the outer sheath circumscribing the inner duct to form at least a portion of a barrier annulus between the inner duct and outer sheath in fluid communication with the first passage via the at least one hole in the first inlet adapter, wherein the barrier annulus has a first closed end at the first inlet adapter and a second closed end at the second inlet adapter, and further comprising an isolation shield mounting the outer sheath on the first inlet adapter, the isolation shield including a first bracket secured to the first inlet adapter and a collar member at least partially supported by the first bracket, the collar member defining a mounting surface for the outer sheath.

2. The intake duct assembly of claim 1, wherein the fire containment apparatus is configured to, during a fire event, vent combustion products within the barrier annulus through the at least one hole into the first passage.

3. The intake duct assembly of claim 1, wherein the inner duct and the outer sheath are flexible.

4. The intake duct assembly of claim 1, wherein the inner duct and the outer sheath comprise fiber reinforced silicone rubber.

5. The intake duct assembly of claim 1,
wherein collar member includes a first flange defining the mounting surface and a radially extending second flange, and
wherein the isolation shield further includes a second bracket secured to the first inlet adapter, wherein the first bracket has a radially extending first leg and the second bracket has a radially extending second leg, the first and second legs defining an axial space for receiving the second flange of the collar member.

6. The intake duct assembly of claim 5, wherein the isolation shield further includes a first insulation member in between the first leg and the second flange in the axial space and a second insulation member in between the second leg and the second flange in the axial space.

7. The intake duct assembly of claim 6, wherein the first and second legs have lengths such that the collar member is separated from the first inlet adapter.

8. The intake duct assembly of claim 7, wherein the first leg has a circumferential edge with one or more protrusions that support the collar member.

9. The intake duct assembly of claim 1, wherein the first closed end of the barrier annulus is formed by a first seal between the first inlet adapter and the outer sheath.

10. The intake duct assembly of claim 9, wherein the outer sheath includes a collar member that forms the first seal with the first inlet adapter.

11. The intake duct assembly of claim 10, wherein the collar member is formed by an insulating material.

12. The intake duct assembly of claim 11, wherein the collar member is integral with the outer sheath.

13. The intake duct assembly of claim 1, wherein the barrier annulus formed between the inner duct and outer sheath is a closed space with the only fluid communication between the barrier annulus and the main passage being the at least one hole in the first inlet adapter.

14. An auxiliary power unit system for an aircraft, comprising:

an enclosure defining a first intake opening;

an auxiliary power unit arranged within the enclosure;

an intake duct assembly extending between the first intake opening in the enclosure to a second intake opening on an external wall of the aircraft, the intake duct assembly comprising a first inlet adapter mounted on the first intake opening, the first inlet adapter including a duct wall defining at least one hole through the duct wall;

a second inlet adapter mounted on the second intake opening through the exterior wall;

a fire containment apparatus extending between the first inlet adapter and the second inlet adapter to form a first passage to direct intake air in a downstream direction through the second opening, through the second inlet adapter, through the fire containment apparatus, through the first inlet adapter, and into the enclosure through the first opening, the fire containment apparatus comprising:

an inner duct mounted on the first inlet adapter at a first position upstream of the at least one hole and mounted on the second inlet adapter, the inner duct forming a portion of the first passage; and an outer sheath mounted on the first inlet adapter at a second position downstream of the at least one hole and mounted on the second inlet adapter, the outer sheath circumscribing the inner duct to form at least a portion of a barrier annulus between the inner duct and outer sheath in fluid communication with the first passage via the at least one hole in the first inlet adapter; and an isolation shield mounting the outer sheath on the first inlet adapter, the isolation shield comprising a first bracket secured to the first inlet adapter and comprising a radially extending first leg;

a second bracket secured to the first inlet adapter and comprising a radially extending second leg, the first and second legs defining an axial space;

a collar member with a first flange defining a mounting surface for the outer sheath and a second flange extending into the axial space between the first bracket and the second bracket;

a first insulation member positioned within the axial space between the first leg of the first bracket and the second flange of the collar member; and a second insulation member positioned within the axial space between the second leg of the second bracket and the second flange of the collar member.

15. The auxiliary power unit system of claim 14, wherein the fire containment apparatus is configured to, during a fire event, vent combustion products within the barrier annulus through the at least one hole into the first passage.

16. The auxiliary power unit system of claim 14, wherein the inner duct and the outer sheath are flexible.

17. The auxiliary power unit system of claim 14, wherein the first leg has a circumferential edge with one or more protrusions that support the collar member.

18. The auxiliary power unit system of claim 14, wherein the outer sheath includes a collar member that forms the first seal with the first inlet adapter, the collar member being formed by an insulating material and integral with the outer sheath.

\* \* \* \* \*